(12) United States Patent
Okuno et al.

(10) Patent No.: US 9,169,979 B2
(45) Date of Patent: Oct. 27, 2015

(54) LIGHT PROJECTOR AND SENSOR

(75) Inventors: Motoharu Okuno, Ayabe (JP);
Tsuyoshi Miyata, Ayabe (JP);
Takamasa Kameda, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 84 days.

(21) Appl. No.: 13/123,840

(22) PCT Filed: Oct. 15, 2009

(86) PCT No.: PCT/JP2009/067848
§ 371 (c)(1),
(2), (4) Date: Apr. 12, 2011

(87) PCT Pub. No.: WO2010/047270
PCT Pub. Date: Apr. 29, 2010

(65) Prior Publication Data
US 2011/0199781 A1    Aug. 18, 2011

(30) Foreign Application Priority Data
Oct. 20, 2008  (JP) .................. 2008-270053

(51) Int. Cl.
*H01L 33/02* (2010.01)
*G02B 5/02* (2006.01)
*F21K 99/00* (2010.01)
*G02B 3/00* (2006.01)
*G02B 3/04* (2006.01)
(Continued)

(52) U.S. Cl.
CPC ... *F21K 9/52* (2013.01); *G02B 3/00* (2013.01); *G02B 3/04* (2013.01); *G02B 6/04* (2013.01); *G02B 6/4206* (2013.01)
USPC .......................... 362/555; 362/558

(58) Field of Classification Search
USPC ................................. 362/355–368
See application file for complete search history.

(56) References Cited

U.S. PATENT DOCUMENTS

| 2002/0102070 A1 | 8/2002 | Nishita |
| 2002/0160656 A1 | 10/2002 | Nishita |
| 2003/0095746 A1 | 5/2003 | Williamson |

(Continued)

FOREIGN PATENT DOCUMENTS

| JP | S54-19687 A | 2/1979 |
| JP | S54-88274 U | 6/1979 |

(Continued)

OTHER PUBLICATIONS

English Translation of Japanese Publication 2003-332615.*

(Continued)

*Primary Examiner* — Mariceli Santiago
*Assistant Examiner* — Brenitra M Lee
(74) *Attorney, Agent, or Firm* — Osha Liang LLP

(57) ABSTRACT

A light projector has a light emitting device having a light emitting surface, an optical fiber having an incident end-face to which light emitted from the light emitting surface enters, and a lens arranged between the light emitting surface of the light emitting device and the incident end-face of the optical fiber. The light emitting device, the optical fiber and the lens are arranged on one optical axis. The optical fiber includes a core region as a region including a single core of uniform refractive index or a region collectively encompassing a plurality of cores having uniform refractive index. The lens converts diffused light emitted from the light emitting surface to diffused light that widens more moderately.

21 Claims, 11 Drawing Sheets

(51) Int. Cl.
*G02B 6/04* (2006.01)
*G02B 6/42* (2006.01)

(56) References Cited

U.S. PATENT DOCUMENTS

| | | |
|---|---|---|
| 2006/0124946 A1 | 6/2006 | Fujita |
| 2006/0193580 A1 | 8/2006 | Matsumoto et al. |

FOREIGN PATENT DOCUMENTS

| | | |
|---|---|---|
| JP | 61017760 U | 2/1986 |
| JP | 5-113525 A | 5/1993 |
| JP | 5-190910 A | 7/1993 |
| JP | 10-104474 A | 4/1998 |
| JP | 2001-036147 A | 2/2001 |
| JP | 2002-250843 A | 9/2002 |
| JP | 2003-004988 A | 1/2003 |
| JP | 2003075690 A | 3/2003 |
| JP | 2003-332615 A | 11/2003 |
| JP | 2005-024617 A | 1/2005 |
| JP | 2005-347224 A | 12/2005 |
| JP | 2006-238097 A | 9/2006 |
| JP | 2007-178884 A | 7/2007 |
| KR | 2002-0083430 A | 11/2002 |
| KR | 100817638 B1 | 3/2008 |
| WO | 98/36295 A1 | 8/1998 |

OTHER PUBLICATIONS

English Translation of Japanese Publication 2003-075690.*
English Translation of Japanese Publication 2007-178884.*
Patent Abstracts of Japan, Publication No. 2005-024617, mailed on Jan. 27, 2005, 1 page.
Patent Abstracts of Japan, Publication No. 05-190910, dated Jul. 30, 1993, 1 page.
Patent Abstracts of Japan, Publication No. 05-113525, dated May 7, 1993, 1 page.
International Search Report issued in PCT/JP2009/067848, mailed on Nov. 17, 2009, w/translation, 2 pages.
Office Action Issued in Korean Application No. 10-2011-7007922, Dated Apr. 30, 2012 (6 Pages With English Translation).
Office Action in Japanese Application No. 2010-178427, Dated Jul. 26, 2011 (4 Pages with English Translation).
English Patent Abstract of JP 2003075690, Published Mar. 12, 2003 (1 Page).
Office Action Issued in Korean Application No. 10-2011-7007922, Dated Sep. 17, 2012 (3 Pages With English Translation).
English Patent Abstract of KR100817638 from esp@cenet, Publication Date: Mar. 27, 2008 (1 Page).
Office Action issued in corresponding Japanese Application No. 2012-264165, mailed Aug. 27, 2013 (6 pages).
Espacenet Patent Abstract for Japanese Publication No. 2007-178884 (1 page).
Office Action for Japanese Patent Application No. 2010-178427 mailed Jan. 8, 2013, with English translation thereof (6 pages).
Patent Abstract for Japanese Utility Model Laying-Open No. 61-017760 layed open on Feb. 1, 1986 (1 page).
Espacenet, Patent Abstract for Japanese Publication No. 2003004988 published Jan. 8, 2003 (1 page).
Espacenet, Patent Abstract for Japanese Publication No. 2006238097 published Sep. 7, 2006 (1 page).
Espacenet, Patent Abstract for Japanese Publication No. 10104474 published Apr. 24, 1998 (1 page).
Extended Search Report issued in corresponding European Application No. 09821967.8, mailed Mar. 18, 2014 (8 pages).
Japanese Office Action of Application No. 2012-264165, mailed May 13, 2014 (7 pages).
esp@cenet Patent Abstract for Japanese Publication No. S54-19687, publication date Feb. 14, 1979. (1 page).
esp@cenet Patent Abstract for Japanese Publication No. 2003-332615, publication date Nov. 21, 2003. (1 page).
Notice of Grounds of Rejection issued in corresponding Japanese Application No. 2014-143494, mailed Jun. 30, 2015 (8 pages).

* cited by examiner

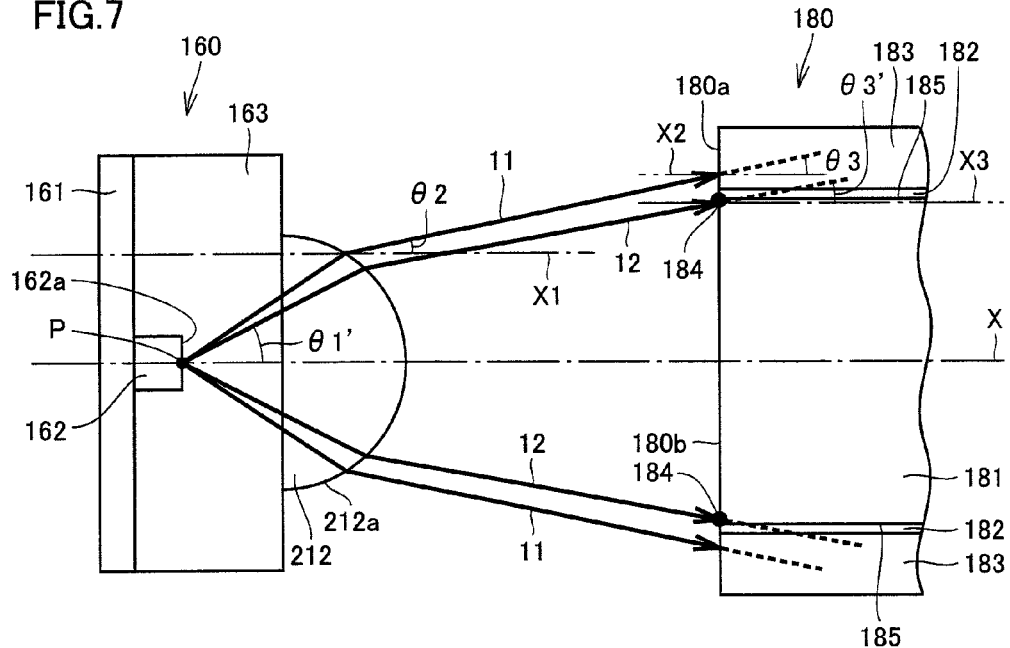
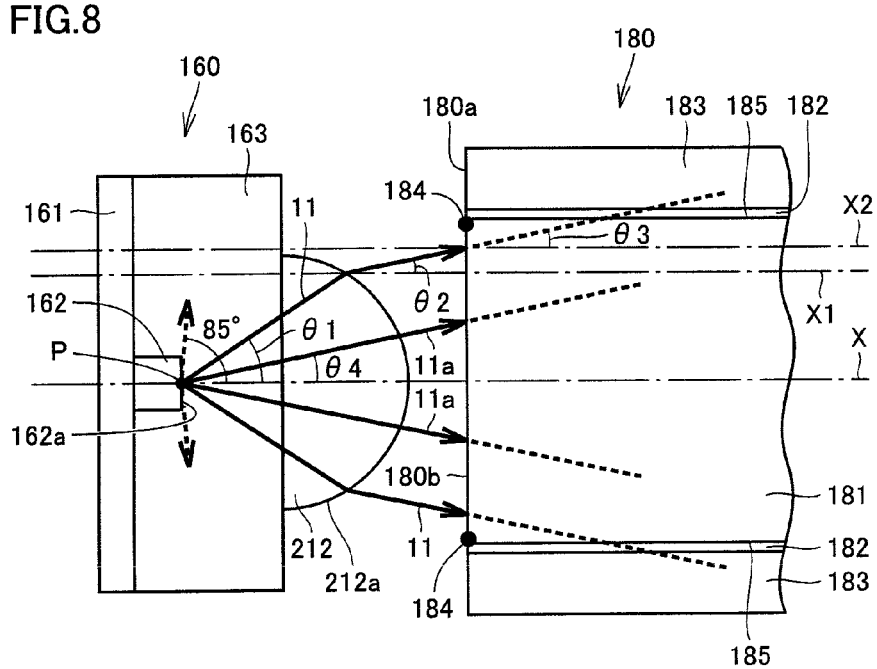

LIGHT PROJECTOR AND SENSOR

BACKGROUND OF THE INVENTION

1. Technical Field

The present invention relates to a light projector and a sensor. More specifically, it relates to a light projector configured to couple light from a light source to an optical fiber, as well as to a sensor provided with the light projector.

2. Background Art

Conventionally, a light projector including a light source and an optical fiber and configured to couple light from the light source to an end surface of the optical fiber has been known. If light emission from the light source spreads over a wide angle, only a part of the light from the light source enters the optical fiber, resulting in low coupling efficiency. Various techniques have been proposed to improve coupling efficiency.

By way of example, Japanese Patent Laying-Open No. 2005-24617 (Patent Document 1) discloses an optical transmitter capable of reducing fluctuation in transmission efficiency. In the optical transmitter, light emitted from a light emitting device is converted to collimated light beams by a lens and coupled to an optical fiber. Further, positional relation among the light emitting device, the lens and the optical fiber is set such that a light spot generated by the collimated light beams on an end surface of the optical fiber is larger than the area of core portion on that end surface. Because of such a configuration, even if the positions of light emitting device, lens and optical fiber should be deviated from designed positions, optical coupling efficiency between the light emitting device and the optical fiber is kept unchanged. Therefore, fluctuation in transmission efficiency can be reduced. Thus, worst value of transmission efficiency is improved and, as a result, transmission efficiency can be made higher.

Patent Document 1: Japanese Patent Laying-Open No. 2005-24617

SUMMARY

Though Japanese Patent Laying-Open No. 2005-24617 describes reduction in fluctuation of coupling efficiency, it does not explicitly describe improvement of coupling efficiency itself.

One or more embodiments of the present invention provides a light projector capable of coupling light from a light source to an optical fiber with high coupling efficiency, as well as to provide a sensor including the same.

A light projector according to one or more embodiments of the present invention includes a light emitting device having a light emitting surface; an optical fiber having an incident end-face to which light emitted from the light emitting surface enters; and a lens arranged between the light emitting surface of the light emitting device and the incident end-face of the optical fiber. The light emitting device, the optical fiber and the lens are arranged on one optical axis. The optical fiber includes a core region as a region including a single core of uniform refractive index or a region collectively encompassing a plurality of cores having uniform refractive index. The lens converts diffused light emitted from the light emitting surface to diffused light that widens more moderately. Where a light beam emitted from a point on the optical axis of the light emitting surface, passed through the lens and reaching the incident end-face of the optical fiber with an angle with respect to the optical axis being equal to an aperture angle of the optical fiber is defined as an aperture angle beam, and a light beam emitted from a point on the optical axis of the light emitting surface, passed through the lens and reaching an outer edge portion of the core region on the incident end-face of the optical fiber is defined as an outer edge beam, arrangement of the light emitting surface, the lens and the optical fiber, and refractive power of the lens are selected to satisfy either the first condition or second condition. The first condition is that the aperture angle beam reaches inside the core region on the incident end-face of the optical fiber. The second condition is that an angle formed by the outer edge beam reaching the outer edge portion and the optical axis is smaller than the aperture angle and an angle formed by the outer edge beam being emitted from the light emitting surface and the optical axis is larger than the aperture angle.

According to one or more embodiments of the present invention, where the first condition is satisfied, an angle formed by the aperture angle beam being emitted from the light emitting surface and the optical axis is in a range of 1.1 times the aperture angle to 85°.

According to one or more embodiments of the present invention, where the first condition is satisfied, an angle formed by the aperture angle beam being emitted from the light emitting surface and the optical axis is in a range of 1.2 times the aperture angle to 85°.

According to one or more embodiments of the present invention, where the second condition is satisfied, an angle formed by the outer edge beam being emitted from the light emitting surface and the optical axis is in a range of 1.1 times the aperture angle to 85°.

According to one or more embodiments of the present invention, where the second condition is satisfied, an angle formed by the outer edge beam being emitted from the light emitting surface and the optical axis is in a range of 1.2 times the aperture angle to 85°.

According to one or more embodiments of the present invention, where the second condition is satisfied, an angle formed by the outer edge beam reaching the outer edge portion and the optical axis is in a range of 0.3 times the aperture angle to the aperture angle.

According to one or more embodiments of the present invention, where the second condition is satisfied, an angle formed by the outer edge beam reaching the outer edge portion and the optical axis is in a range of 0.5 times the aperture angle to the aperture angle.

According to one or more embodiments of the present invention, the lens includes a single convex surface facing the incident end-face of the optical fiber as a surface providing the refractive power.

According to one or more embodiments of the present invention, the light projector further includes a first reflection member. The first reflection member includes a reflection surface. The reflection surface is arranged between the light emitting surface and the incident end-face of the optical fiber to surround the lens, and reflects light emitted from the lens.

According to one or more embodiments of the present invention, the light projector further includes a second reflection member. The second reflection member includes a reflection surface. The reflection surface is provided around the light emitting device and reflects light emitted from the light emitting device.

According to one or more embodiments of the present invention, the light emitting device is a light emitting diode chip.

According to one or more embodiments of the present invention, the core region at the incident end-face has a circular shape.

According to one or more embodiments of the present invention, the light projector further includes a holding member. The holding member includes an abutting surface abutting a peripheral edge of the incident end-face of the optical fiber. The holding member holds, by the abutment to the peripheral edge of the incident end-face, position of the incident end-face on the optical axis.

According to one or more embodiments of the present invention, a sensor is provided with any of the light projectors described above.

A light projector according to one or more embodiments of the present invention is capable of coupling light from a light source to an optical fiber with high coupling efficiency.

BRIEF DESCRIPTION OF THE DRAWINGS

FIG. 7 illustrates conditions for outer edge beam 12 to be transmitted through a core portion 181 of a projecting side optical fiber 180.

FIG. 8 illustrates conditions of an angle formed by optical axis X and an aperture angle beam emitted from a light emitting point P.

DETAILED DESCRIPTION

Figure 1:
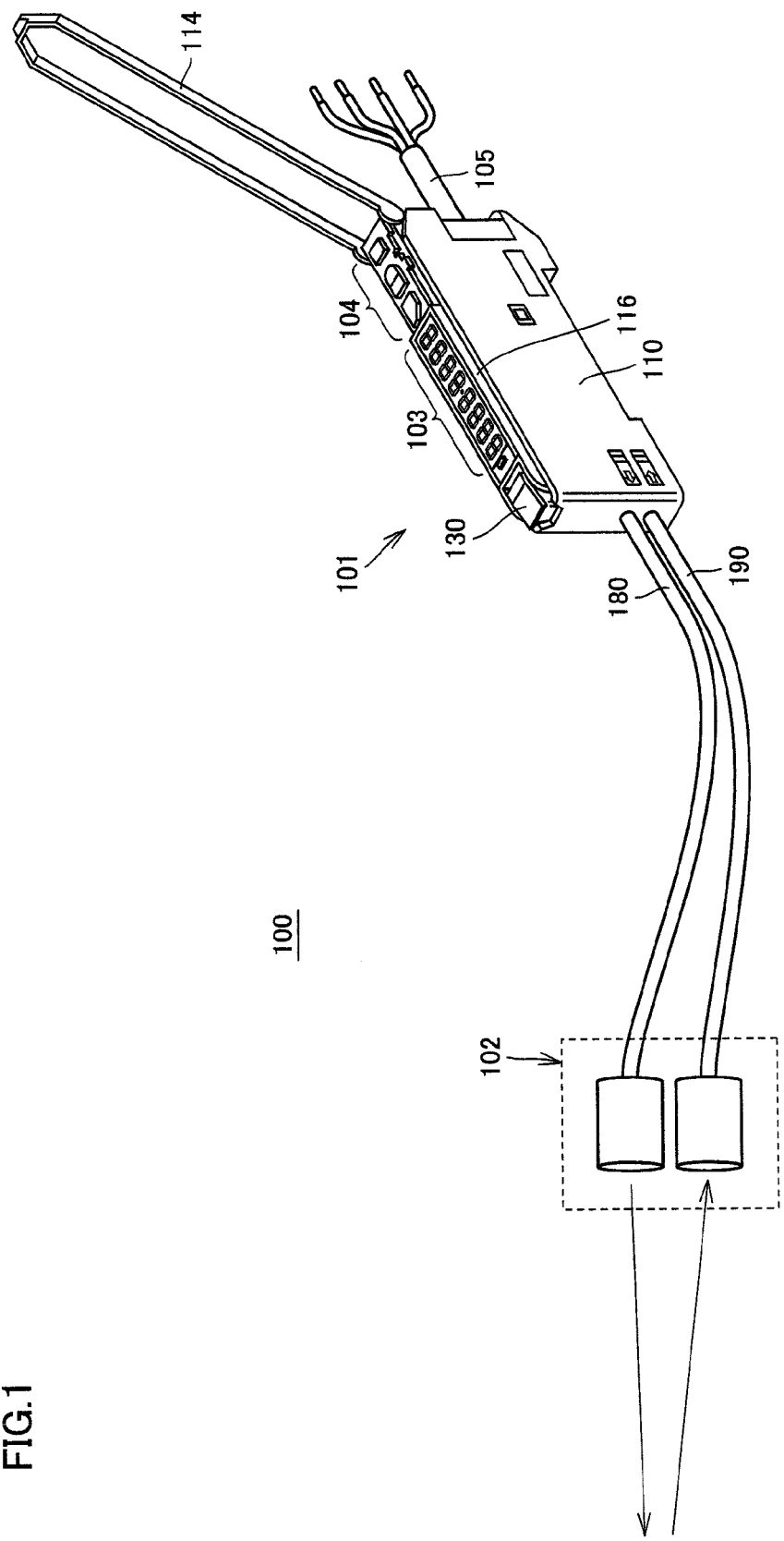
FIG. 1 is a schematic perspective view showing an example of an optical fiber type photoelectric sensor including the light projector in accordance with one or more embodiments of the present invention.

In the following, embodiments of the present invention will be described in detail with reference to the figures. In the figures, the same or corresponding portions are denoted by the same reference characters and description thereof will not be repeated. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The light projector in accordance with one or more embodiments of the present invention is used, for example, in an optical fiber type photoelectric sensor utilizing a light emitting diode package (hereinafter referred to as an LED package) in which a light emitting diode chip (hereinafter referred to as an LED chip) is packaged as a light projecting device.

FIG. 1 is a schematic perspective view showing the optical fiber type photoelectric sensor provided with the light projector in accordance with one or more embodiments of the present invention. Referring to FIG. 1, optical fiber type photoelectric sensor 100 includes a main body 101, a head unit 102, and a projecting side optical fiber 180 and a receiving side optical fiber 190 optically connecting main body 101 to head unit 102.

Main body 101 mainly includes a main body casing 110, an opening/closing cover 114 attached rotatably on main body casing 110, and a frame 116 contained in main body casing 110, and has a display unit 103 and an operation unit 104 on an upper surface of frame 116 that is exposed when cover 114 is opened. On a front-wall portion of main body casing 110 positioned on the front surface of main body 101, an opening to which projecting side optical fiber 180 is inserted and an opening to which receiving side optical fiber 190 is inserted are formed. To these openings, projecting side optical fiber 180 and receiving side optical fiber 190 are inserted, respectively.

From the back side of main body 101, an electric cord 105 having core lines such as a power line and a signal line integrated together is drawn out. At a prescribed position on an upper surface of main body 101, a rotating lever 130 is provided, which is operated when projecting side optical fiber 180 and receiving side optical fiber 190 are fixed to main body 101. An LED package (see, for example, FIG. 2) as a light source, a PD package as a light receiving unit and the like are contained in main body 101.

Projecting side optical fiber 180 transmits light emitted from the LED package to head unit 102. Receiving side optical fiber 190 transmits light incident on head unit 102 to the PD package.

Head unit 102 projects the light transmitted by projecting side optical fiber 180 to an object to be detected, and captures the projected light reflected from the object of detection, which reflected light is transmitted by receiving side optical fiber 190 to main body 101.

Figure 2:
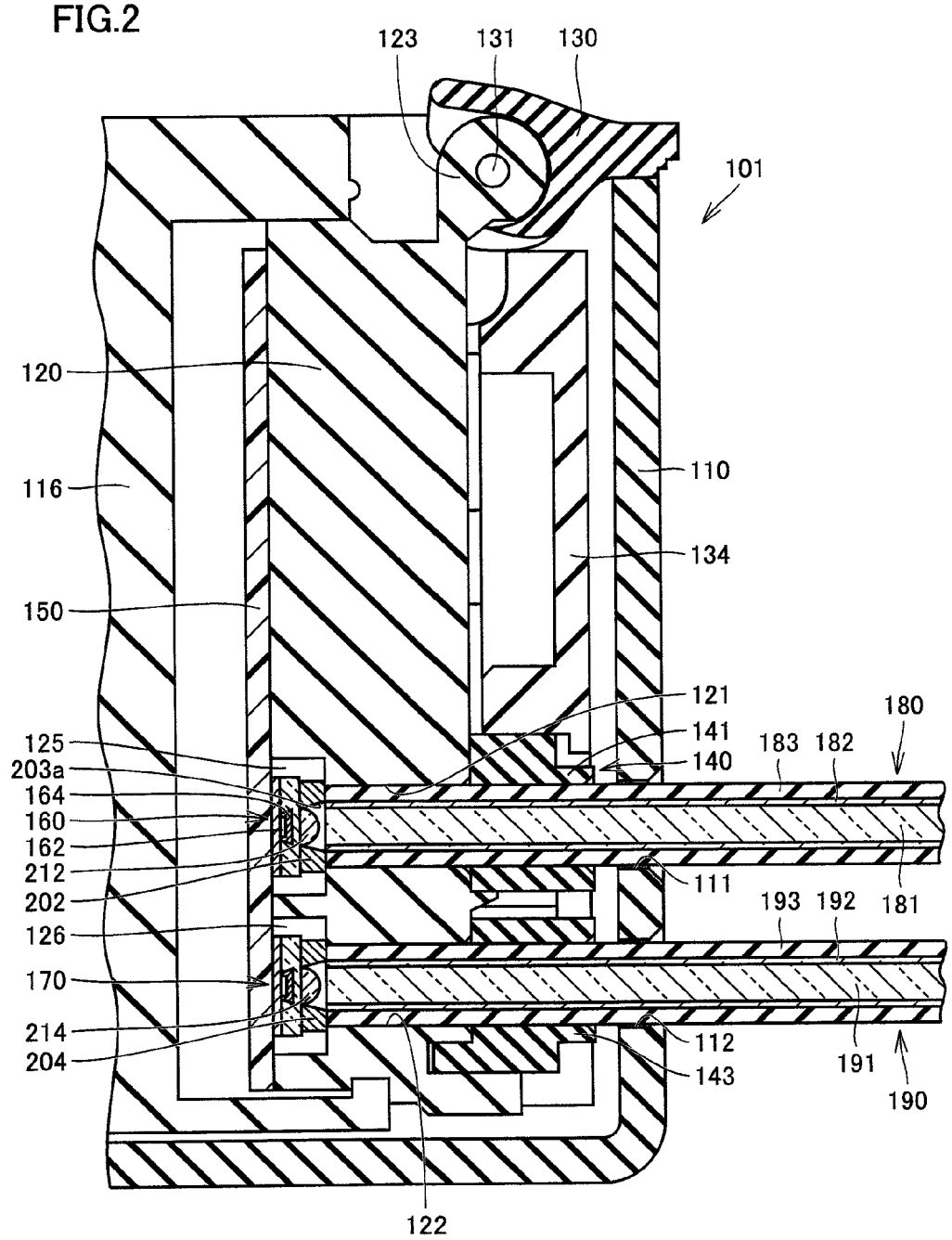
FIG. 2 shows an example of an internal configuration of a main body 101 shown in FIG. 1.
Figure 3:
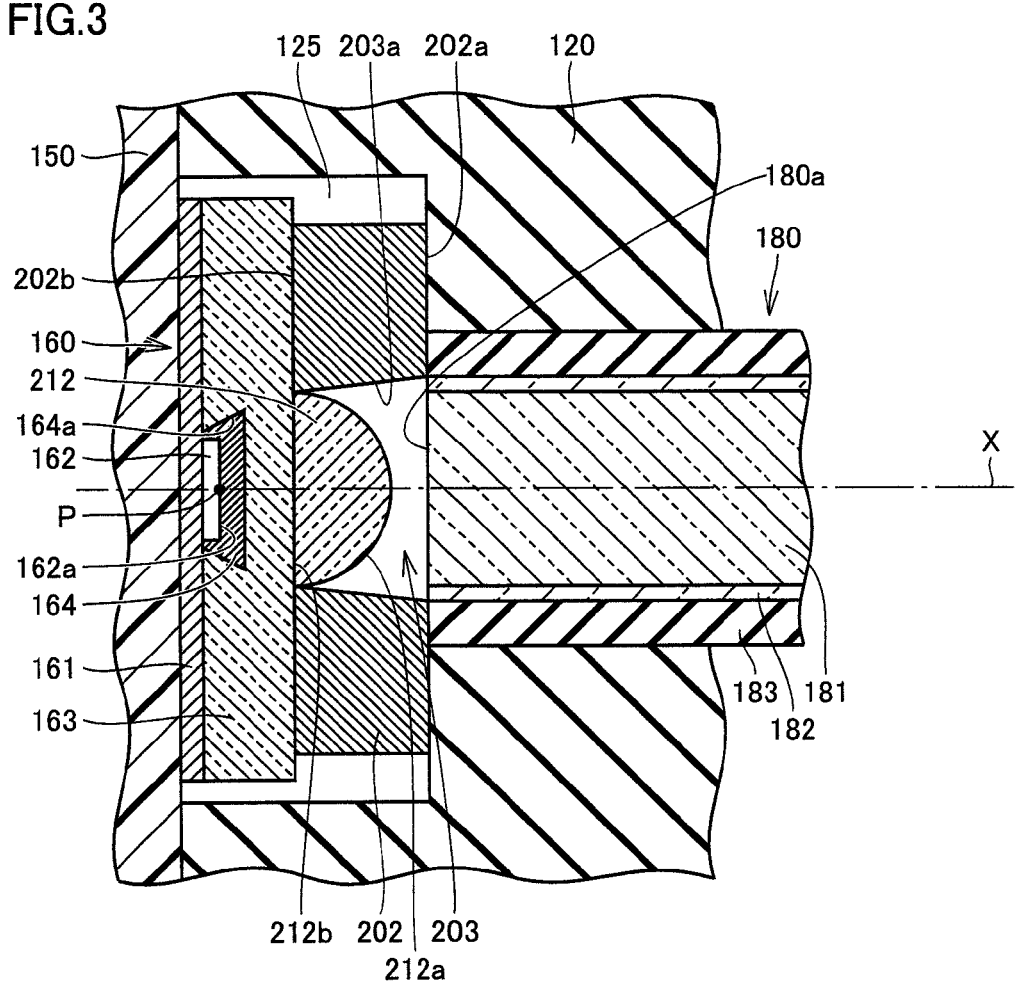
FIG. 3 shows, in enlargement, a portion around LED package 160 shown in FIG. 2.

FIG. 2 shows an example of the internal configuration of main body 101 shown in FIG. 1. FIG. 3 shows, in enlargement, a portion around LED package 160 shown in FIG. 2. The internal configuration of main body 101 will be described with reference to FIG. 2, and the configuration of light projector in accordance with one or more embodiments of the present invention will be described in detail with reference to FIGS. 2 and 3.

As shown in FIG. 2, frame 116 is contained in main body casing 110. A space of a prescribed size is formed between the front surface of frame 116 and a front-wall portion of main body casing 110, and various components are arranged in this space. Specifically, in this space, a holder member 120 for holding projecting side optical fiber 180 and receiving side optical fiber 190, an optical fiber fixing member 140 fixing projecting side optical fiber 180 and receiving side optical fiber 190 held by holding member 120 on main body 101, and a mounting board 150 having LED package 160 and PD package 170 mounted thereon, are mainly arranged.

Holder member 120 is fixed on the front surface of frame 116. In holder member 120, a pair of through holes is formed. One of the through holes communicates with a space 125 formed behind holder member 120, and the other of the through holes communicates with a space 126 formed behind holder member 120.

Projecting side optical fiber 180 is passed through an opening 111 formed in main body casing 110 and an upper side hollow portion provided in optical fiber fixing member 140 and inserted to the through hole formed in holder member 120. An inner wall 121 of the through hole formed in holder member 120 holds an incident end-face of projecting side optical fiber 180. Similarly, receiving side optical fiber 190 is passed through an opening 112 formed in main body casing 110 and a lower side hollow portion provided in optical fiber fixing member 140 and inserted to the through hole formed in holder member 120. An inner wall 122 of the through hole formed in holder member 120 holds an output end-face of receiving side optical fiber 190.

At an upper front end of holder member 120, a hinge 123 is formed. Hinge 123 axially supports a rotation shaft 131 of rotating lever 130 mentioned above, so as to rotatably supports rotating lever 130. Further, on a front surface of holder member 120, a slider 134 guided by a guide member (not shown) and slides upward/downward linked with an operation of rotating lever 130, and an optical fiber fixing member 140 that elastically deforms when pressed by slider 134 and thereby nips and fixes projecting side optical fiber 180 and receiving side optical fiber 190, are assembled.

Rotating lever 130, slider 134 and optical fiber fixing member 140 constitute a fixing mechanism for simultaneously fixing projecting side optical fiber 180 and receiving side optical fiber 190 on main body 101. Optical fiber fixing member 140 is formed, for example, by a resin member to attain desired elasticity, and it has an upper side fixing portion 141 defining the upper side hollow portion to which projecting side optical fiber 180 is inserted, and a lower side fixing portion 143 defining the lower side hollow portion to which receiving side optical fiber 190 is inserted.

When a user rotates rotating lever 130, slider 134 slides downward, guided by the guide member. As slider 134 comes down, an upper portion of upper side fixing portion 141 and an upper portion of lower side fixing portion 143 of optical fiber fixing member 140 elastically deform downward, respectively. By the elastic deformation of upper side fixing portion 141, projecting side optical fiber 180 is nipped, and by the elastic deformation of lower side fixing portion 143, receiving side optical fiber 190 is nipped. The configuration for nipping projecting side optical fiber 180 and receiving side optical fiber 190 is not limited to the one shown in FIG. 2, and other configuration may be adopted.

Mounting board 150 is fixed on a back surface of holder member 120. On a main surface of mounting board 150, LED package 160 and PD package 170 are mounted. LED package 160 and PD package 170 are housed in spaces 125 and 126 formed behind holder member 120, respectively. A light emitting surface of LED package 160 faces the incident end-face of projecting side optical fiber 180, and a light receiving surface of PD package 170 faces the output end-face of receiving side optical fiber 190.

Referring to FIGS. 2 and 3, the light projector in accordance with one or more embodiments of the present invention includes LED package 160 including LED chip 162 as a light emitting device, a lens 212, a reflector 202 and projecting side optical fiber 180.

LED chip 162 has a light emitting surface 162a. Lens 212 is arranged between light emitting surface 162a and the incident end-face of projecting side optical fiber 180.

LED chip 162, lens 212 and projecting side optical fiber 180 are arranged on an optical axis X. Optical axis X is an axis that passes through light emitting surface 162a of LED chip 162, lens 212 and the core portion of incident end-face 180a of projecting side optical fiber 180. According to one or more embodiments of the present invention, optical axis X passes through the center point of core portion of incident end-face of projecting side optical fiber 180. According to one or more embodiments of the present invention, optical axis X is aligned with the optical axis of projecting side optical fiber 180 and the optical axis of lens 212. A point P on light emitting surface 162a corresponds to an intersecting point between light emitting surface 162a and optical axis X.

LED package 160 includes base 161, translucent resin 163 and reflector 164, in addition to above-described LED chip 162. LED chip 162 and reflector 164 are mounted on the main surface of base 161, and sealed with translucent resin 163.

LED chip 162 emits diffused light mainly from light emitting surface 162a. It is noted, however, that light may be emitted from a side surface of LED chip 162. Reflector 164 has a reflecting surface 164a that surrounds the side surface of LED chip 162. Light that may be emitted from the side surface of LED chip 162 is reflected by reflecting surface 164a and led to lens 212.

Lens 212 has a hemispherical surface 212a and a planar surface 212b. Hemispherical surface 212a is a single convex surface facing incident end-face of projecting side optical fiber 180, providing the refractive power of lens 212. Here, the refractive power means degree of refraction in an optical system (for example, lens) that is rotationally symmetric about an axis. Planar surface 212b is an incident surface to which diffused light emitted from light emitting surface 162a enters.

Lens 212 receives at the incident surface (planar surface 212b) the diffused light from LED chip 161. Lens 212 refracts and emits the diffused light incident on it, such that the incident diffused light widens more moderately. In other words, lens 212 converts the diffused light emitted from light emitting surface 162a to diffused light that widens more moderately. Lens 212 refracts and emits the diffused light emitted from the center of light emitting surface 162a (from the point on the optical axis) such that the light widens with a smaller angle with respect to optical axis X than when it is originally emitted. By way of example, by a design in which light emitting surface 162a of LED chip 162 is positioned closer to lens 212 than the focal point of lens 212, the above described function of the lens can be attained.

Reflector 202 is arranged between LED package 160 and projecting side optical fiber 180. A through hole 203 is formed in reflector 202, and hemispherical lens 212 is inserted to the through hole 203.

The light emitted from LED package 160 is converted by lens 212 to widen more moderately, passed through through hole 203 formed in reflector 202 and coupled to incident end-face 180a of projecting side optical fiber 180. An inner circumferential surface 203a of through hole 203 functions as a reflecting surface for reflecting part of the light emitted from lens 212 and guiding the reflected light to incident end-face 180a of projecting side optical fiber 180. In one or more embodiments of the present invention, lens diameter of lens 212 is substantially the same as the diameter of core portion (core diameter) of projecting side optical fiber 180. Reflector 202 is formed of a metal plate (for example, aluminum). Inner circumferential surface 203a of through hole 203 is formed as a specular reflection surface. The specular reflection surface refers to a reflection surface that macroscopically follows the law of reflection, from which the light is reflected at the same angle as the incident light angle. The method of forming the specular reflection surface is not specifically limited. By way of example, a through hole may be formed in a metal plate by press working. The inner circumferential surface of the through hole may be used as the specular reflection surface.

Reflector 202 further has a main surface 202a facing incident end-face 180a of projecting side optical fiber 180, and a main surface 202b facing LED package 160. Main surface 202a abuts the peripheral edge portion of incident end-face 180a of projecting side optical fiber 180. On the other hand, main surface 202b is in contact with the surface of LED package 160, which LED package 160 is fixed on a main surface of mounting board 150 attached to holder member 120. LED package 160 is fixed by holder member 120 and mounting board 150 such that its position in the direction of optical axis X does not fluctuate. Therefore, variation of the distance between light emitting surface 162a and incident end-face 180a of projecting side optical fiber 180 can be prevented.

Further, lens 212 is adhered to the surface of LED package 160. Therefore, variation of relative positional relation between light emitting surface 162a and lens 212 in the direction of optical axis X can be prevented. From the reasons described above, variation of relative positional relation in the direction of optical axis X among light emitting surface 162a, lens 212 and projecting side optical fiber 180 can be prevented.

Particularly, in one or more embodiments of the present invention, it is possible to fix projecting side optical fiber 180 with the peripheral edge portion of incident end-face 180a of projecting side optical fiber being in contact with the main surface 202a of reflector 202. Therefore, even when projecting side optical fiber 180 is attached to and detached from main body casing 110 repeatedly, variation of relative positional relation among light emitting surface 162a, lens 212 and projecting side optical fiber 180 every time the projecting side optical fiber 180 is attached or detached can be prevented.

Further, since LED package 160 is adhered to lens 212, loss in projected amount of light caused by reflection and the like can be reduced.

Referring to FIG. 2, reflector 204 is arranged between PD package 170 and the output end-face of receiving side optical fiber 190. Similar to reflector 202, reflector 204 is formed of a metal plate (for example, aluminum). A through hole is formed in reflector 204, and hemispherical lens 214 is inserted to the through hole. Spherical surface of lens 214 faces the output end-face of receiving side optical fiber 190. The light emitted from output end-face of receiving side optical fiber 190 passes through the through hole formed in reflector 204 to be incident on lens 214. The light incident on lens 214 is collected and enters PD package 170. The light that entered PD package 170 is coupled to a light receiving surface of the photodiode chip.

Each of the projecting side and receiving side optical fibers 180 and 190 has a core portion through which light passes, a clad portion provided around the core portion and having smaller refractive index than the core portion, and a jacket covering the outer surface (side surface) of the clad portion. Specifically, projecting side optical fiber 180 includes a core portion 181, a clad portion 182, and a jacket 183. Receiving side optical fiber 190 includes a core portion 191, a clad portion 192 and a jacket 193.

In each of the projecting side and receiving side optical fibers 180 and 190, the clad portion has smaller refractive index than the core portion. Light that entered the core portion with a prescribed angle or smaller of incidence with respect to the optical axis of optical fiber is totally reflected at the interface between the core portion and the clad portion, whereby the light is propagated through the core portion. In the following, the prescribed angle will be referred to as "aperture angle."

An optical fiber having a core of large diameter is desired for the projecting side and receiving side optical fibers 180 and 190. With larger diameter, the amount of light propagated through each of the projecting side and receiving side optical fibers 180 and 190 can be increased. In one or more embodiments of the present invention, plastic optical fiber can be applied to the projecting side and receiving side optical fibers 180 and 190. A plastic optical fiber generally has a larger core diameter than silica optical fiber and, therefore, it can suitably be used for the light projector in accordance with one or more embodiments of the present invention.

Types of plastic optical fibers generally include single core fiber with a single core and multi-core fiber with a plurality of cores. In the following, a configuration using a single core fiber as projecting side optical fiber 180 will be described. It is noted, however, that a multi-core fiber may be used as projecting side optical fiber 180.

Figure 4:
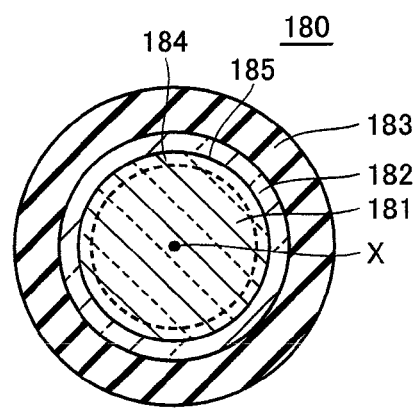
FIG. 4 is a cross-sectional view showing an example of a single-core fiber.

FIG. 4 is a cross-sectional view showing an example of single core fiber. As shown in FIG. 4, projecting side optical fiber 180 includes a single core. The core corresponds to core portion 181 shown in FIGS. 2 and 3. It is assumed that the optical axis X is the same as the central axis of single core fiber.

In the cross-section (or the incident end-face, same in the following) of the optical fiber, the portion occupied by core portion 181 will be referred to as a core region, and in the cross-section of the optical fiber, the region outside the core region will be referred to as a clad region. An outer edge portion 184 of the core region is a portion inside the core region and along the border between core region and clad region. In FIG. 4, the border between core region and clad region is indicated by a border line 185 for convenience. The border between the core region and clad region may be defined as a reflection surface at which the light entering the core region is totally reflected, or may be defined based on a difference in refractive index between the core region and the clad region.

In one or more embodiments of the present invention, the refractive index of core portion 181 included in the single core fiber is uniform. Further, the core region has a circular shape.

Figure 5:
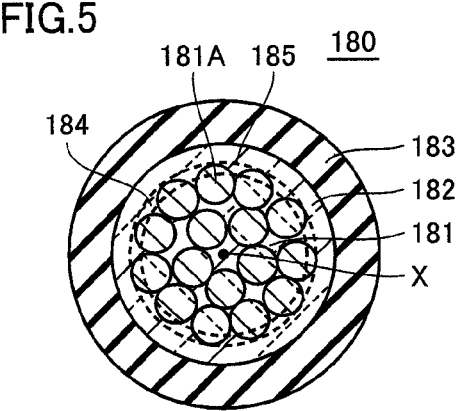
FIG. 5 is a cross-sectional view showing an example of a multi-core fiber.

FIG. 5 is a cross-sectional view showing an example of a multi-core fiber. As shown in FIG. 5, projecting side optical fiber 180 includes a plurality of cores 181A. It is assumed that the optical axis X is the same as the central axis of multi-core fiber. Core portion 181 is a region encompassing the plurality of cores 181A in the multi-core fiber and internally in contact with the core at the farthest position in the radial direction of multi-core fiber from the optical axis X. Specifically, in the cross-section (or the incident end-face, same in the following) of the multi-core fiber, the core region is a region collectively including the cross-sections of the plurality of cores 181A. In the cross-section of the optical fiber, the region outside the core region will be referred to as the clad region.

Further, a border line 185 representing the border between core region and clad region is in contact with a core at the farthest position in the radial direction of multi-core fiber from the optical axis X among the plurality of cores 181A.

Assuming that the plurality of cores 181A are arranged in axial symmetry with respect to the optical axis X, border line 185 is an envelope of the cross-sections of the plurality of cores 181A and is a circle, as shown in FIG. 5. As in the case of single core fiber, the outer edge portion 184 of the core region of the multi-core fiber is a portion inside the core region and along the border between core region and clad region.

The plurality of cores 181A have the same refractive index, and in each core 181A, the refractive index is uniform. Therefore, similar to the core portion of single core fiber, core portion 181 of the multi-core fiber is a region having uniform refractive index.

Figure 6:
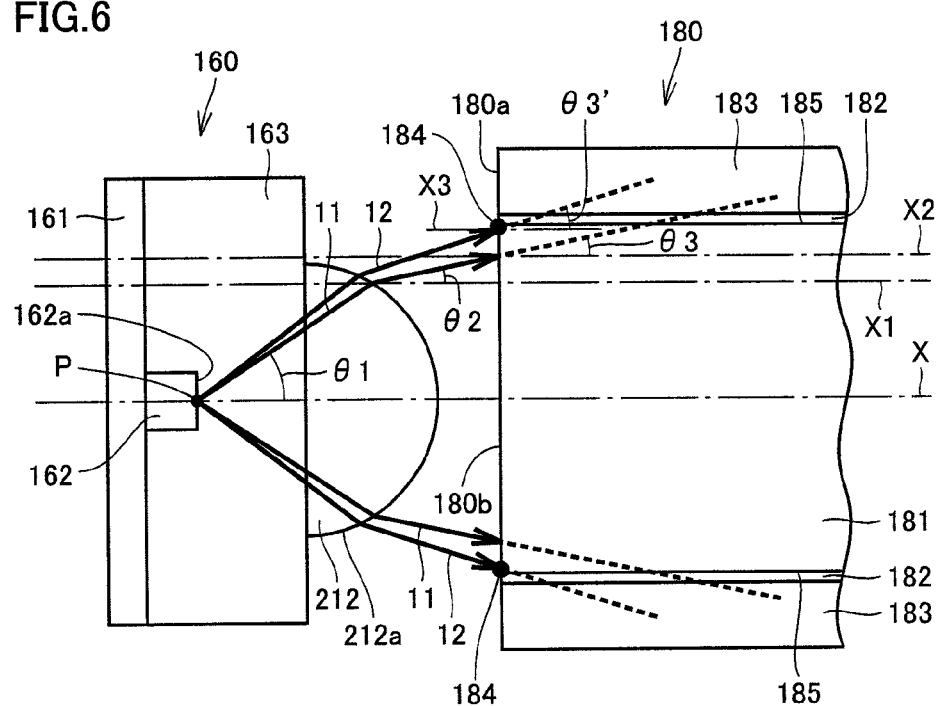
FIG. 6 illustrates light beams emitted from LED chip 162.

Next, referring to FIGS. 6 to 8, the light projector in accordance with one or more embodiments of the present invention will be described in greater detail. As described above, lens 212 refracts and emits diffused incident light such that the light widens with a smaller angle with respect to optical axis X than when the light was originally emitted from the center of light emitting surface 162a. Namely, in the light projector in accordance with one or more embodiments of the present invention, a diverging optical system is applied. FIGS. 6 to 8 schematically show the configuration of light projector in accordance with one or more embodiments of the present invention for the description of diverging optical system. Specifically, FIGS. 6 to 8 show LED package 160, lens 212 and projecting side optical fiber 180, among the components of light projector in accordance with one or more embodiments of the present invention.

FIG. 6 illustrates light beams emitted from LED chip 162. As shown in FIG. 6, first, an aperture angle beam 11 and an outer edge beam 12 will be defined as light beams emitted from the light emitting point P at the center (on the optical axis) of light emitting surface 162a.

Aperture angle beam 11 is a light beam emitted from light emitting point P and passes through lens 212 to be incident on core region 180b of incident end-face 180a at an angle equal to the aperture angle with respect to optical axis X. Specifically, aperture angle beam 11 is emitted from point P at an angle θ1 with respect to optical axis X, and refracted by hemispherical surface 212a of lens 212. Aperture angle beam 11 is emitted from hemispherical surface 212a at an angle θ2 with respect to an axis X1 that is parallel to optical axis X, and reaches incident end-face 180a at an angle θ3 with respect to an axis X2 that is parallel to optical axis X. The angle θ3 is equal to the aperture angle of projecting side optical fiber 180.

Here, the angle θ1 is larger than the angle θ2. Further, axes X1 and X2 are parallel to each other, and between lens 212 and incident end-face 180a of projecting side optical fiber 180, aperture angle beam 11 goes straight. Therefore, there is a relation of θ2=θ3. Thus, angles θ1, θ2 and θ3 satisfy the relation of θ1>θ2=θ3.

Outer edge beam 12 is a light beam emitted from light emitting point P and passes through lens 212 to reach outer edge portion 184 of core region 180b. It is assumed that outer edge beam 12 reaches the outer edge portion 184 at an angle θ3' with respect to an axis X3 that is parallel to optical axis X.

In one or more embodiments of the present invention, arrangement of light emitting surface 162a, lens 212 and projecting side optical fiber 180 and the refractive power of lens 212 are selected such that aperture angle beam 11 reaches the inside of core region 180b at incident end-face 180a of projecting side optical fiber 180. Alternatively, as will be described with reference to FIG. 7, in one or more embodiments of the present invention, arrangement of light emitting surface 162a, lens 212 and projecting side optical fiber 180 and the refractive power of lens 212 are selected such that the angle θ3' when outer edge beam 12 reaches outer edge portion 184 of core region 180b becomes equal to or smaller than the aperture angle.

FIG. 6 shows a state in which the arrangement of light emitting surface 162a, lens 212 and projecting side optical fiber 180 and the refractive power of lens 212 are selected such that aperture angle beam 11 reaches the inside of core region 180b at incident end-face 180a of projecting side optical fiber 180. Aperture angle beam 11 reaches the inside of core region 180b and its incident angle is the aperture angle, so that the beam can proceed through core portion 181. On the other hand, outer edge beam 12 proceeds through an outer portion of incident end-face 180a in the radial direction than aperture angle beam 11. Therefore, the angle θ3' formed by outer edge beam 12 and axis X3 is larger than angle θ3. Therefore, outer edge beam 12 reaching outer edge portion 184 of core region 180b cannot go through the inside of core portion 181.

Assume, for example, that the distance between light emitting surface 162a and lens 212 is constant. In one or more embodiments of the present invention, lens 212 is adhered to LED package 160 and, therefore, such a state can be realized. When light emitting surface 162a and lens 212 in this state are moved closer to incident end-face 180a of projecting side optical fiber 180, a state is reached in which aperture angle beam 11 reaches the inside of core region 180b on incident end-face 180a of projecting side optical fiber 180 and outer edge beam 12 proceeds through an outer side in the radial direction of incident end-face 180a than aperture angle beam 11.

FIG. 7 shows conditions for outer edge beam 12 to be transmitted through core portion 181 of projecting side optical fiber 180. Referring to FIG. 7, outer edge beam 12 is emitted from light emitting point P at an angle θ1' with respect to optical axis X. Outer edge beam 12 emitted from light emitting point P is refracted by lens 212 and reaches outer edge portion 184 of core region 180b. Here, the angle θ1' is larger than θ3', and the angle θ3' is smaller than the aperture angle (θ2 or θ3). If the arrangement of light emitting surface 162a, lens 212 and projecting side optical fiber 180 and the refractive power of lens 212 are selected to satisfy such conditions, outer edge beam 12 incident on outer edge portion 184 of core region 180b can proceed through the inside of core portion 181.

Here, aperture angle beam 11 shown in FIG. 7 proceeds through a portion outer in the radial direction of incident end-face than outer edge beam 12. Therefore, aperture angle beam 11 reaches a region outside core region 180b on the incident end-face, and aperture angle beam 11 cannot proceed through the inside of core portion 181. In the description above, the term "incident end-face" refers not only the incident end-face 180a of projecting side optical fiber 180 (that is, the physically present incident end-face) but also a virtual surface exceeding incident end-face 180a. Specifically, the case in which "aperture angle beam 11 . . . proceeds through a portion outer in the radial direction of incident end-face than outer edge beam 12" includes a case in which aperture angle beam 11 reaches outside of the physically existing incident end-face.

By way of example, assume that light emitting surface 162a and lens 212 are moved away from incident end-face 180a of projecting optical fiber 180 with the distance between light emitting surface 162a and lens 212 on optical axis X kept unchanged. Here, a state is realized in which outer edge beam 12 proceeds through an inner side in the radial direction of incident end-face 180a than aperture angle beam 11.

Next, emission angles (θ1, θ1') of aperture angle beam 11 and outer edge beam 12 from light emitting point P will be described.

FIG. 8 illustrates conditions of the angle formed by the aperture angle beam emitted from light emitting point P and optical axis X. Referring to FIG. 8, assuming that there is no refraction function attained by the lens, if the light emitted from point P reaches core region 181 with the emission angle θ4 being smaller than aperture angle θ3, the light propagates through core portion 181. If the emission angle θ4 is larger than aperture angle θ3, however, the light cannot propagate, even if it reached core portion 181.

In contrast, in the presence of refraction function of lens 212, if light emitted at emission angle θ1 from point P reaches the inside of core region at aperture angle θ3, the angle θ1 will be the maximum emission angle that realizes propagation through core portion 181. Specifically, the angle θ1 is the emission angle of the aperture angle beam. Since emission angle θ1 is larger than θ3, larger amount of light can be propagated through core portion 181 than when the refraction function by lens 212 is not provided. According to one or more embodiments of the present invention, the angle (θ1 of FIG. 8) formed by the aperture angle beam and optical axis X when the aperture angle beam is emitted from light emitting point P is made at least 1.1 times larger than the aperture angle. According to one or more embodiments of the present invention, the angle formed by the aperture angle beam and optical axis X is at least 1.2 times larger than the aperture angle.

It is noted, however, that the emission angle θ1 of aperture angle beam from light emission point P cannot be increased without any limit. Assume, for example, that a light beam is emitted from point P at an angle of 90° with respect to the optical axis X. Here, it is practically impossible to refract the light beam by lens 212 such that the incident angle to incident end-face 180a of projecting side optical fiber 180 becomes equal to the aperture angle of projecting side optical fiber 180 and that the aperture angle beam enters inside the core region 180b. From a practical viewpoint, the upper limit of emission angle of the aperture angle beam from light emission point P is about 85°.

Specifically, in one or more embodiments of the present invention, the angle θ1 formed by the aperture angle beam and the optical axis X when the aperture angle beam is emitted from light emitting point P is in the range of 1.1 times the aperture angle of projecting side optical fiber 180 to 85° and, according to one or more embodiments of the present invention, in the range of 1.2 times the aperture angle of projecting side optical fiber 180 to 85°. By setting the angle θ1 in this manner, it becomes possible to have aperture angle beam 11 reach inside core region 180b on incident end-face 180a. As a result, it becomes possible to have aperture angle beam 11 propagated through core portion 181.

The above-described conditions are also met as regards the angle θ1' formed by outer edge beam 12 and optical axis X when outer edge beam 12 is emitted from light emission point P, in the state in which aperture angle beam 11 reaches outside the core region 180b on incident end-face 180a of projecting side optical fiber 180.

Assuming that there is no refraction function attained by lens 212, if the light emitted from point P reaches core region 181 with the emission angle being smaller than aperture angle θ3, the light propagates through core portion 181. If the emission angle is larger than aperture angle θ3, however, the light cannot propagate, even if it reached core portion 181. On the contrary, in the presence of refraction function of lens 212, if light emitted at emission angle θ1' from point P reaches outer edge portion 184 (substantially the same as border line 185) at an angle θ3' with respect to the optical axis X and the angle θ3' is smaller than the aperture angle θ3, the angle θ1' will be the maximum emission angle that realizes propagation through core portion 181. Here, the emission angle θ1' is the emission angle of the outer edge beam. If the emission angle θ1' is larger than the aperture angle θ3, larger amount of light can be propagated through core portion 181 than when the refraction function by lens 212 is not provided. Further, assuming that a light beam is emitted from point P at an angle of 90° with respect to the optical axis X, it is practically impossible to refract the light beam by lens 212 such that the beam is incident on the outer edge portion 184 of core region 180b. From a practical viewpoint, the upper limit of emission angle of the outer edge beam from light emission point P is about 85°.

Specifically, in one or more embodiments of the present invention, the angle θ1' formed by the outer edge beam and the optical axis X when the outer edge beam is emitted from light emitting point P is in the range of 1.1 times the aperture angle of projecting side optical fiber 180 to 85° and, according to one or more embodiments of the present invention, in the range of 1.2 times the aperture angle of projecting side optical fiber 180 to 85°. By setting the angle θ1' in this manner, it becomes possible to have outer edge beam 12 propagated through core portion 181.

Further, in one or more embodiments of the present invention, lens 212 is adapted to emit diffused light. As to the degree of diffusion, according to one or more embodiments of the present invention, the incident angle (θ3') of outer edge beam 12 on core region 180b is at least 0.3 times the aperture angle. According to one or more embodiments of the present invention, the angle θ3' is set to be at least 0.5 times the aperture angle. It goes without saying that in a state in which the aperture angle beam reaches outside the core region, the angle θ3' is smaller than the aperture angle.

In one or more embodiments of the present invention, by using the diverging optical system, it becomes possible to couple light to the core region of incident end-face of an optical fiber with higher coupling efficiency than that attained by the collimating optical system. The reason why the diverging optical system is more advantageous than the collimating optical system in terms of coupling efficiency will be described with reference to FIGS. 9 to 12.

Figure 9:
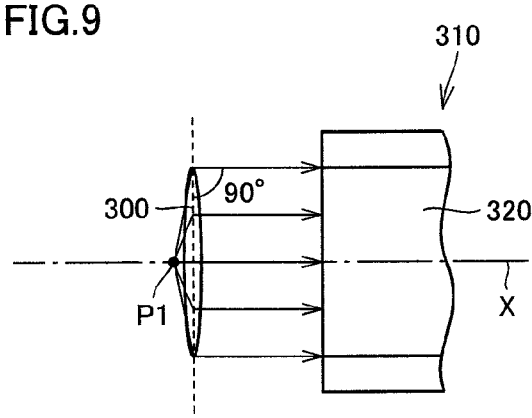
FIG. 9 is a schematic diagram showing a collimating optical system as an example to be compared with one or more embodiments of the present invention.

FIG. 9 schematically shows a collimating optical system as an example to be compared with one or more embodiments of the present invention.

Referring to FIG. 9, according to paraxial geometric optics (paraxial theory), it is possible to convert all diffused light beams emitted from a light source at the focal position P1 of a lens 300 to collimated light beams by lens 300 and to couple the converted light beams to a core portion 320 of an optical fiber 310. Actually, however, such an optical coupling as shown in FIG. 9 cannot be realized.

Particularly, considering refraction of a light beam attained by a single refracting surface, there is a limit in the angle to which the light beam can be refracted, both in principle and in practice. The angle can be derived from Snell's law, and it is determined by the refractive index of a medium on the incident side and the refractive index of a medium on the emitting side of the light beam.

Figure 10:
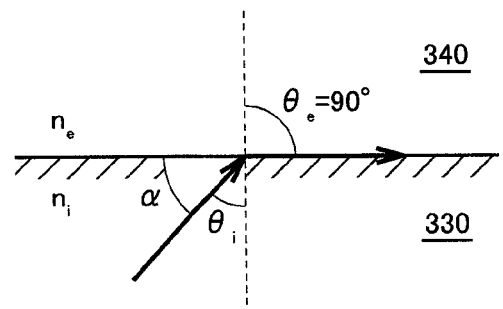
FIG. 10 illustrates limit of refraction angle when a light beam is refracted by a single refracting surface.

FIG. 10 illustrates the limit in refraction angle when refraction of light is attained with a single refracting surface.

Referring to FIG. 10, the angle a is a limit angle of light beam refraction. In the following, the angle a will be referred to as the "maximum refraction angle α." The maximum refraction angle a represents the angle of emitted light beam with respect to the incident light beam, when incident angle $\theta_i$ of the light beam on a medium 330 is the critical angle.

Let us represent refractive index of medium 330 by $n_i$ and the refractive index of medium 340 by $n_e$. According to Snell's law, there is a relation of the following equation.

$$n_i \times \sin\theta_i = n_e \times \sin\theta_e$$

Here, $\theta_e = 90°$ and, therefore, the right side of the equation above can be written as $n_e \times \sin(90°) = n_e$.

Next, using specific values of $n_i = 2.0$ and $n_e = 1.0$ for the refractive indexes $n_i$ and $n_e$, the maximum refraction angle $\alpha$ is calculated. The maximum refraction angle $\alpha$ is calculated as follows.

$$2\sin\theta_i = 1$$

$$\sin\theta_i = 0.5$$

$$\theta_i = 30°$$

$$\therefore \alpha = 90° - \theta_i = 60°$$

Next, practically possible maximum refraction angle will be considered. If we consider the maximum refraction angle a assuming that the refractive index of medium 330 on the incident side is 2.0 and the refractive index on the emitting side is 1.0, then, $\alpha = 60°$. The value a is the limited maximum refraction angle smaller than 90°.

Though it is assumed that $n_i = 2.0$ in the calculation above, actually, the refractive index of a general lens is about 1.4 to about 1.7. Therefore, in one or more embodiments of the present invention, the maximum refraction angle $\alpha$ is smaller than 60°.

As regards the control of light by refraction utilizing, for example, lens design, it is difficult to control light near the maximum refraction angle. Therefore, if the maximum refraction angle is 60°, the refraction angle at which the light can be controlled is about 40° at the largest. The reason why it becomes difficult to control light near the maximum refraction angle is, as can be derived from Snell's law, that as the incident angle comes closer to the critical angle, the ratio of change of the emission angle with respect to the incident angle comes to change abruptly.

Figure 11:
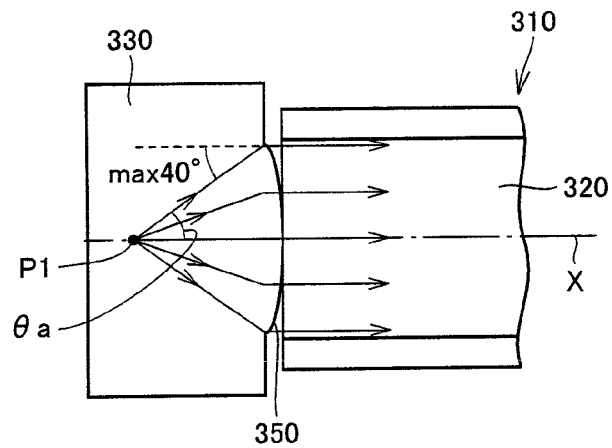
FIG. 11 illustrates optical coupling to an incident end-face of an optical fiber attained by a collimating optical system.

FIG. 11 illustrates optical coupling to the incident end-face of an optical fiber attained by the collimating optical system. As shown in FIG. 11, light beams emitted from the light source at the focal position P1 of the lens proceed through medium 330 and refracted at lens surface 350 to be collimated light beams. In order to enable control of light, the limited refraction angle (40° at the largest) is defined, as described above. Therefore, in the collimating optical system, it is impossible to take all light beams from the light source.

Figure 12:
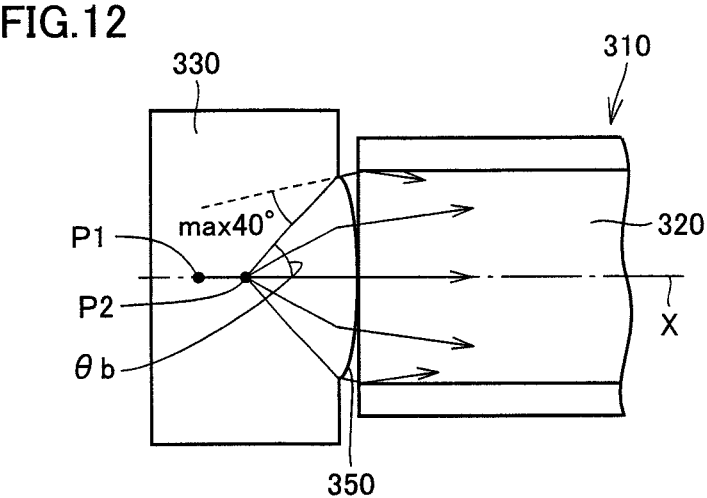
FIG. 12 illustrates a diverging optical system in accordance with one or more embodiments of the present invention.

It is noted, however, that an optical fiber can guide a light beam that is incident on core portion 320 at an angle not larger than the aperture angle. Therefore, it is unnecessary to introduce collimated light beams to core portion 320. As shown in FIG. 12, if the light source is arranged at a position P2 from the lens focal position P1 closer to the lens surface 350, the amount of light taken from the light source to the lens increases, while the light emitted from lens surface 350 becomes divergent light. As long as the incident angle of the divergent light to core portion 320 is equal to or smaller than the aperture angle, however, the divergent light can be coupled to optical fiber 310 (core portion 320).

The diverging optical system in accordance with one or more embodiments of the present invention can be realized by positioning the light emitting surface closer to the lens surface than the focal position of the convex lens, as shown in FIG. 12. Generally, when an object is placed inside the focal point of a convex lens (placed between the focal point and the convex lens), light beams emitted from one point of the object are not collected to one point by the convex lens. However, lines in the directions opposite to the directions of light beams emitted from the convex lens intersect at one point. Therefore, by positioning the light emitting surface closer to the lens surface than the focal position of the convex lens, a diverging optical system can be realized.

In the collimating optical system shown in FIG. 11, when the light as the upper limit that can be taken to optical fiber 310 is emitted from the light emitting point (the light source on focal position P1), the angle of the light with respect to the optical axis X is $\theta a$. In the diverging optical system shown in FIG. 12, when the light as the upper limit that can be taken to optical fiber 310 is emitted from the light emitting point (the light source on position P2), the angle of the light with respect to the optical axis X is $\theta b$. The angle $\theta b$ is larger than $\theta a$.

Specifically, when the diverging optical system is adopted, the light beams of wider angle emitted from the light emitting point come to be coupled to the optical fiber. As a result, the amount of light coupled to the optical fiber can be increased. According to one or more embodiments of the present invention, the emitted light beams of wider range can be coupled to the optical fiber and hence, the amount of light coupled to the optical fiber can be increased. Therefore, by one or more embodiments of the present invention, the coupling efficiency can be improved.

Further, according to one or more embodiments of the present invention, the diffused light incident on lens 212 is refracted to diverge more moderately. Therefore, by one or more embodiments of the present invention, the coupling efficiency can be improved than when the diffused light incident on the lens is refracted to widen more broadly. This will be described with reference to FIGS. 13 and 14.

Figure 13:
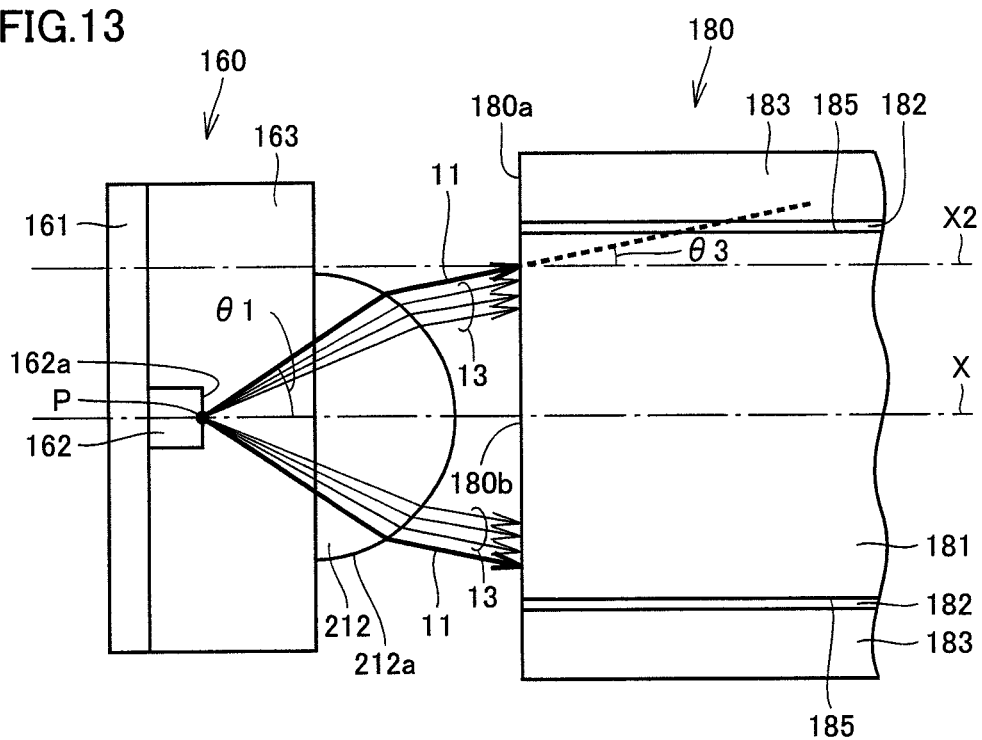
FIG. 13 is a schematic illustration showing refraction of light realized by a lens in the optical system in accordance with one or more embodiments of the present invention.

Referring to FIG. 13, in the optical system in accordance with one or more embodiments of the present invention, aperture angle beams 11 are emitted to realize $\theta 1 > \theta 3$ ($\theta 3$ is equal to the aperture angle of projecting side optical fiber 180). Specifically, diffused light emitted from light emitting point P is refracted by lens 212 to widen more moderately. Light beams 13 proceeding through inner side than aperture angle beams 11 reach core region 180a at an angle smaller than $\theta 3$ and, therefore, light beams 13 can proceed through the inside of core portion 181. Therefore, the amount of light coupled to projecting side optical fiber 180 can be increased. Thus, by one or more embodiments of the present invention, the coupling efficiency can be improved.

Figure 14:
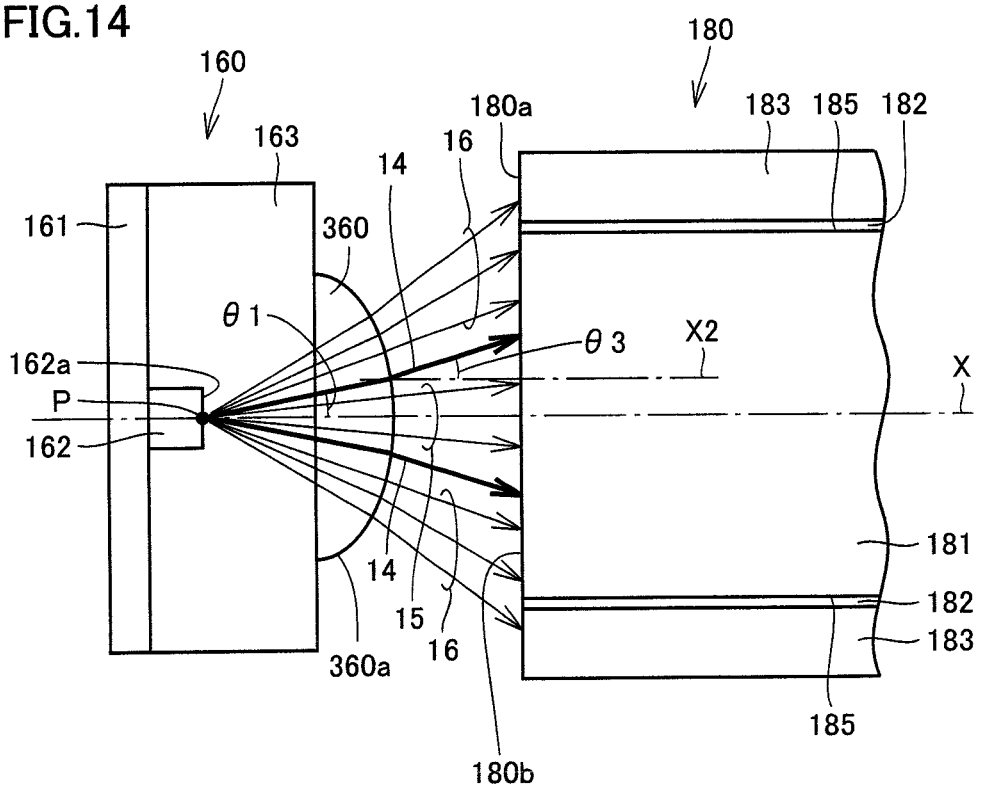
FIG. 14 is a schematic illustration showing an optical system that further diverges diffused light emitted from a light source.

FIG. 14 schematically shows an optical system that further diverges the diffused light emitted from a light source. Referring to FIG. 14, in the optical system, light beams 14 emitted at an angle $\theta 1$ from light emitting point P is refracted by a lens surface 360a of lens 360, to be incident at an angle $\theta 3$ on core region 180b of projecting side optical fiber 180. As to the angles $\theta 1$ and $\theta 3$, the relation $\theta 1 < \theta 3$ is satisfied. Specifically, the diffused light emitted from light emitting point P is refracted in a direction of further divergence, by lens surface 360a of lens 360.

Light beams 15 proceeding through the inner side than light beams 14 reach core region 180b at an angle smaller than $\theta 3$, because of the refraction at lens surface 360a. Therefore, light beams 15 can proceed through the inside of core portion 181. On the contrary, light beams 16 proceeding through the outer side than light beams 14 reach core region 180b at an angle larger than $\theta 3$, or reach a portion outer than the core region of the incident-end face of projecting side optical fiber 180. Here, the term "incident end-face" refers not only to the physically present incident end-face 180a but also a virtual surface exceeding incident end-face 180a. Therefore, light beams 16 cannot proceed through the inside of core portion 181.

Therefore, in this optical system, light beams 14 and light beams 15 proceeding through the inner side can proceed through the inside of core portion 181. It is noted, however, that lens surface 360a refracts the incident diffused light to be further widened and, therefore, the amount of light coupled to projecting side optical fiber 180 becomes smaller than that attained by one or more embodiments of the present invention.

From the reasons as described above, in the optical system in accordance with one or more embodiments of the present invention, the angle θ1 becomes larger than in the optical system shown in FIG. 14 and, the coupling efficiency becomes higher.

Figure 15:
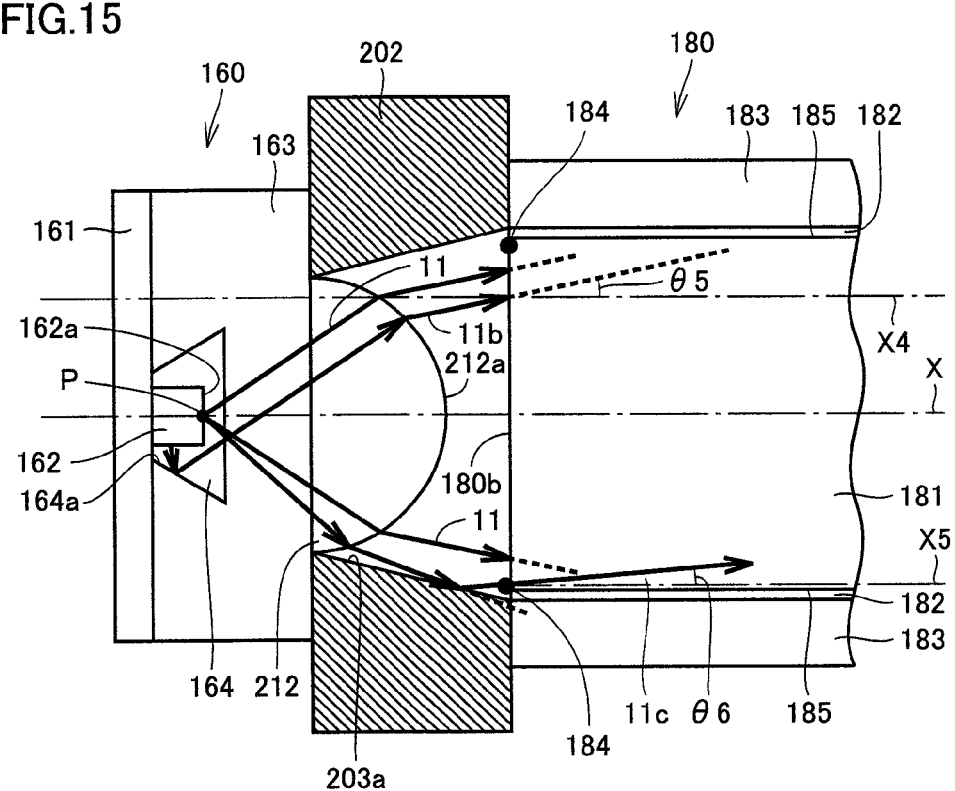
FIG. 15 illustrates effects attained by reflectors 164 and 202.

Further, in one or more embodiments of the present invention, a reflector 164 is provided around LED chip 162, as shown in FIG. 15. A light beam 11b emitted from a side surface of LED chip 162 can be reflected by a reflecting surface 164a of reflector 164 and guided to lens 212. Light beam 11b is refracted by lens 212 and reaches the incident end-face of projecting side optical fiber 180 at an angle θ5 with respect to an axis X4 parallel to the optical axis X. If the angle θ5 is equal to or smaller than the aperture angle of projecting side optical fiber 180, light beam 11b can proceed through the inside of core portion 181. Therefore, by providing reflector 164 around LED chip 162, coupling efficiency can further be improved.

Further, in one or more embodiments of the present invention, a reflector 202 is provided around lens 212. A light beam 11c emitted from lens 212 is reflected by a reflecting surface (inner circumferential surface 203a of the through hole) of reflector 202, and reaches the incident end-face of projecting side optical fiber 180 at an angle θ6 with respect to an axis X5 parallel to the optical axis X. If the angle θ6 is equal to or smaller than the aperture angle of projecting side optical fiber 180, light beam 11c can proceed through the inside of core portion 181. Therefore, by providing reflector 202 around lens 212, coupling efficiency can further be improved.

Figure 16:
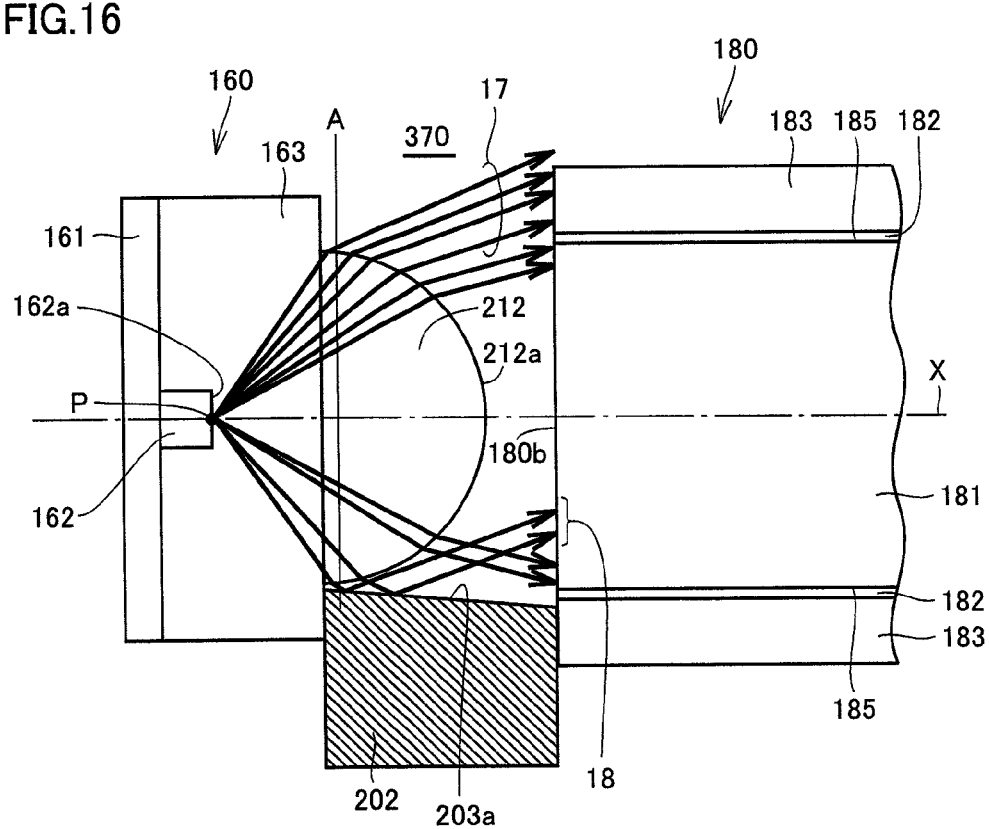
FIG. 16 shows in greater detail the effect attained by reflector 202.

FIG. 16 shows, in greater detail, the effect attained by reflector 202. Referring to FIG. 16, in one or more embodiments of the present invention, by lens 212 (that is, refracting optical system), the incident diffused light is more moderately diffused. Therefore, as already described above, coupling efficiency can be improved by one or more embodiments of the present invention. The light emitted from lens 212 is diffused light and, therefore, according to one or more embodiments of the present invention the diameter of lens 212 is smaller than the diameter of core region 180b.

It is noted, however, that there must be a finite distance between LED chip (light emitting surface 162a) and lens 212. Further, light emitting surface 162a is not a point but has a certain area. Therefore, from the viewpoint of coupling efficiency, it is necessary to make lens diameter as large as possible. Thus, according to one or more embodiments of the present invention, the lens diameter and the diameter of core region are substantially the same. In one or more embodiments of the present invention, the lens diameter and the diameter of core region are substantially the same.

Here, according to one or more embodiments of the present invention, core region 180b is placed at position A, for example, so that as large an amount of light as possible can enter core region 180b. Because of the thickness of lens 212, however, there is inevitably a space 370 between lens 212 and incident end-face 180a of projecting side optical fiber 180. In one or more embodiments of the present invention, through hole 203 of reflector 202 corresponds to space 370 of FIG. 16.

The divergent light emitted from the lens surface (hemispherical surface 212a) of lens 212 widens as it goes through space 370. Without the reflector 202, part of the divergent light (light beams 17) emitted from the lens surface (hemispherical surface 212a) cannot enter the core region.

Thus, one or more embodiments of the present invention provides a cylindrical reflector 202 around lens 212. Reflector 202 can reflect light while maintaining an angle controlled by lens 212 and, hence, the light controlled by lens 212 can enter core portion 181. Further, the reflecting surface of reflector 202 (inner circumferential surface 203a of the through hole) is inclined at such an angle that makes the diameter of inner circumferential surface 203a becomes larger toward the optical fiber, whereby the incident angle of light beams to core portion 181 can be corrected. Therefore, even such light beams (light beams 18) that cannot be adjusted solely by lens 212 to have the incident angle to core portion 181 smaller than the aperture angle can be reflected by reflector 202 to be incident on core portion 181. As a result, coupling efficiency can further be improved.

The angle of reflecting surface of each of reflectors 164 and 202 with respect to the optical axis X is appropriately set to attain the above-described effects.

Figure 17:
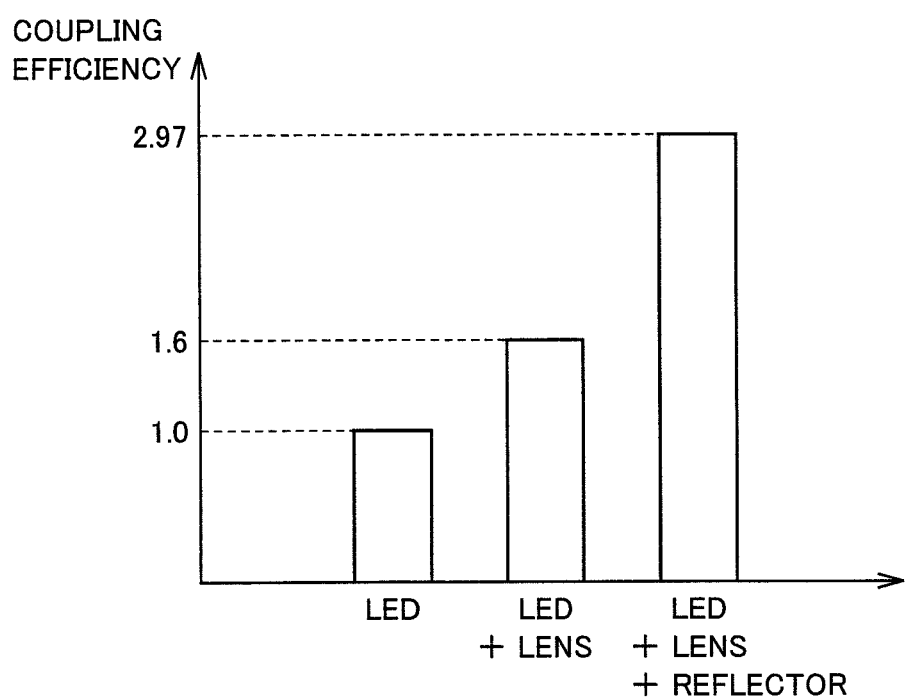
FIG. 17 shows exemplary measurements of coupling efficiency attained by the light projector in accordance with one or more embodiments of the present invention.

FIG. 17 shows exemplary results of measurements of coupling efficiency of the light projector in accordance with one or more embodiments of the present invention. FIG. 17 shows measurements of coupling efficiency when the position of light emitting point P on the optical axis X is set to a position that maximizes the coupling efficiency. Referring to FIG. 17, the coupling efficiency when the light from an LED package is directly coupled to an optical fiber is used as a reference value (that is, 1). In that case, lens 212 is not provided and, naturally, there is no reflection by reflector 202.

When the light from LED package 160 was coupled to the projecting side optical fiber through lens 212, the coupling efficiency was about 1.6. Further, when the light coming out from lens 212 was reflected by reflector 202, the coupling efficiency was about 2.97. From these results, it can be seen that the light projector in accordance with one or more embodiments of the present invention improves the coupling efficiency.

In one or more of the embodiments described above, an optical fiber type photoelectric sensor having photo transmitter and photo receiver integrated together has been described as an example. Naturally, it is possible to provide an optical fiber type photoelectric sensor in which the photo transmitter and photo receptor are not integrated but housed in different casings.

Further, the sensor in accordance with one or more embodiments of the present invention is applicable both to a reflection type optical fiber photoelectric sensor and a transmission type optical fiber photoelectric sensor.

In the above description, one or more embodiments of the present invention is applied to a photoelectric sensor in which the optical fibers are detachably attached to the main body casing. One or more embodiments of the present invention is naturally applicable when the optical fiber or fibers are fixed on the main body casing.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE SIGNS 11, 11a aperture angle beams, 11b, 11c 13-18 light beams, 12 outer edge beam, 100 optical fiber type photoelectric sensor, 101 main body, 102 head unit, 103 display unit, 104 operation unit, 105 electric cord, 110 main body casing, 111 opening, 112 opening, 114 opening/closing cover, 116 frame, 120 holder member, 121, 122 inner walls, 123 hinge, 125, 126 spaces, 130 rotating lever, 131 rotation shaft, 134 slider, 140 optical fiber fixing member, 141 upper side fixing portion, 143 lower side fixing portion, 150 mounting board, 160 LED package, 161 base, 162 LED chip, 162a light emitting surface, 163 translucent resin, 164, 202, 204 reflectors, 164a reflecting surface, 170 PD package, 180 projecting side optical fiber, 180a incident end-face, 180b core region, 181, 191 core portions, 181A core, 182, 192 clad portions, 183, 193 jackets, 184 outer edge portion, 185 border line, 190 receiving side optical fiber, 202a, 202b main surfaces, 203 through hole, 203a inner circumferential surface, 212, 214, 300, 360 lenses, 212a hemispherical surface, 212b planar surface, 310 optical fiber, 320 core portion, 330, 340 media, 350, 360a lens surfaces, 370 space, P light emitting point, P1 focal position, P2 position, X optical axis, X1-X5 axes.

The invention claimed is:

1. A light projector, comprising:
a light emitting device having a light emitting surface;
an optical fiber having an incident end-face to which light emitted from said light emitting surface enters; and
a lens arranged between said light emitting surface of said light emitting device and said incident end-face of said optical fiber;
wherein said light emitting device, said optical fiber and said lens are arranged on one optical axis,
wherein said optical fiber includes a core region as a region including a single core of uniform refractive index or a region collectively encompassing a plurality of cores having uniform refractive index,
wherein said lens converts diffused light emitted from said light emitting surface to diffused light that widens more moderately,
wherein a light beam emitted from a point on said optical axis of said light emitting surface, passed through said lens and reaching said incident end-face of said optical fiber with an angle with respect to said optical axis being equal to an aperture angle of said optical fiber is defined as an aperture angle beam, and where a light beam emitted from a point on said optical axis of said light emitting surface, passed through said lens and reaching an outer edge portion of said core region on said incident end-face of said optical fiber is defined as an outer edge beam, said light emitting surface, said lens and said optical fiber, and refractive power of said lens are arranged to satisfy: a first condition in which said aperture angle beam reaches inside said core region on said incident end-face of said optical fiber, or a second condition in which an angle formed by said outer edge beam reaching said outer edge portion and said optical axis is smaller than said aperture angle, and an angle formed by said outer edge beam being emitted from said light emitting surface and said optical axis is larger than said aperture angle,
wherein said light projector further comprises a first reflection member including a first reflection surface arranged between said light emitting surface and said incident end-face of said optical fiber to surround said lens for reflecting light emitted from said lens, and
wherein said first reflection member includes an abutting surface abutting a peripheral edge of said incident end-face of said optical fiber.

2. The light projector according to claim 1, wherein when said first condition is satisfied, an angle formed by said aperture angle beam being emitted from said light emitting surface and said optical axis is in a range from 1.1 times said aperture angle to 85°.

3. The light projector according to claim 2, wherein when said first condition is satisfied, an angle formed by said aperture angle beam being emitted from said light emitting surface and said optical axis is in a range from 1.2 times said aperture angle to 85°.

4. The light projector according to claim 2, wherein said lens includes a single convex surface facing said incident end-face of said optical fiber as a surface providing said refractive power.

5. The light projector according to claim 3, wherein said lens includes a single convex surface facing said incident end-face of said optical fiber as a surface providing said refractive power.

6. The light projector according to claim 1, wherein when said second condition is satisfied, an angle formed by said outer edge beam being emitted from said light emitting surface and said optical axis is in a range from 1.1 times said aperture angle to 85°.

7. The light projector according to claim 6, wherein when said second condition is satisfied, an angle formed by said outer edge beam being emitted from said light emitting surface and said optical axis is in a range from 1.2 times said aperture angle to 85°.

8. The light projector according to claim 7, wherein when said second condition is satisfied, an angle formed by said outer edge beam reaching said outer edge portion and said optical axis is in a range from 0.3 times said aperture angle to said aperture angle.

9. The light projector according to claim 8, wherein when said second condition is satisfied, an angle formed by said outer edge beam reaching said outer edge portion and said optical axis is in a range from 0.5 times said aperture angle to said aperture angle.

10. The light projector according to claim 6 wherein when said second condition is satisfied, an angle formed by said outer edge beam reaching said outer edge portion and said optical axis is in a range from 0.3 times said aperture angle to said aperture angle.

11. The light projector according to claim 10, wherein when said second condition is satisfied, an angle formed by said outer edge beam reaching said outer edge portion and said optical axis is in a range from 0.5 times said aperture angle to said aperture angle.

12. The light projector according to claim 1, wherein when said second condition is satisfied, an angle formed by said outer edge beam reaching said outer edge portion and said optical axis is in a range from 0.3 times said aperture angle to said aperture angle.

13. The light projector according to claim 12, wherein when said second condition is satisfied, an angle formed by said outer edge beam reaching said outer edge portion and said optical axis is in a range from 0.5 times said aperture angle to said aperture angle.

14. The light projector according to claim 1, wherein said lens includes a single convex surface facing said incident end-face of said optical fiber as a surface providing said refractive power.

15. The light projector according to claim 1, further comprising a second reflection member including a reflection surface provided around said light emitting device for reflecting light emitted from said light emitting device.

16. The light projector according to claim 1, wherein said light emitting device is a light emitting diode chip.

17. The light projector according to claim 1, wherein said core region at said incident end-face has a circular shape.

18. The light projector according to claim 1, wherein said first reflection member holds, by the abutment to the peripheral edge of said incident end-face, position of said incident end-face on said optical axis.

19. A sensor, provided with the light projector according to claim 1.

20. The light projector according to claim 1, further comprising:
    a holding member that surrounds an outer surface of the optical fiber,
    wherein the holding member abuts a portion of the abutting surface of the first reflection member.

21. The light projector according to claim 1,
    wherein an edge of said first reflection surface on a side of said optical fiber is connected to an edge of said abutting surface.

* * * * *